Jan. 20, 1959 I. J. P. JAMES 2,870,249

COLOUR TELEVISION APPARATUS

Filed Oct. 7, 1953 3 Sheets-Sheet 1

Inventor
IVANHOE JOHN PENFOUND JAMES
By Glascock Downing & Seebold
Attorney

Jan. 20, 1959 I. J. P. JAMES 2,870,249

COLOUR TELEVISION APPARATUS

Filed Oct. 7, 1953 3 Sheets-Sheet 2

Inventor
IVANHOE JOHN PENFOUND JAMES
By Glascock Downing & Seebold
Attorney

Jan. 20, 1959 I. J. P. JAMES 2,870,249

COLOUR TELEVISION APPARATUS

Filed Oct. 7, 1953 3 Sheets-Sheet 3

Inventor
IVANHOE JOHN PENFOUND JAMES

By Mason Downing Seebold
Attorney

United States Patent Office
2,870,249
Patented Jan. 20, 1959

2,870,249

COLOUR TELEVISION APPARATUS

Ivanhoe John Penfound James, South Ealing, London, England, assignor to Electric & Musical Industries Limited, Hayes, Middlesex, England, a British company Application October 7, 1953, Serial No. 384,543

Claims priority, application Great Britain October 11, 1952

8 Claims. (Cl. 178—5.4)

The present invention relates to the generation of colour television signals, especially but not exclusively to the generation of signals of the dot sequential type.

In a known method of generating dot sequential signals a camera is employed in which are arranged three pick-up tubes, one tube analysing red light from the object of which an image is to be transmitted, another tube analysing blue light from the object and the third tube analysing green light from the object. Each tube provides a continuous output during the scanning and for the purpose of providing a dot sequential signal a method of sampling is employed in which the outputs of the pick-up tubes are gated in turn to an output circuit so that signals are derived from this circuit of dot sequential type. This form of arrangement is inconvenient both from the standpoint fo the physical bulk of a camera employing three pick-up tubes, and furthermore from the standpoint of the difficulty of colour register of the three tubes. This register is the more difficult since in order to obtain a final picture of high definition it is necessary that each of the three colour tubes of the camera should function with the same definition.

An object of the present invention is to provide improved apparatus for generating colour television signals which can be utilised to produce colour signals of the dot sequential or similar type with the aid of only a single pick-up tube in the camera, so that the difficulties aforesaid are reduced.

A further object of the present invention is to provide apparatus for converting colour television signals of the field sequential type into colour television signals of a different type, for example the dot sequential type.

A further object of the present invention is to provide apparatus for converting colour television signals of the field sequential type and of one field repetition rate into colour television signals of a different type and different field repetition rate.

For example in the case of a three colour system the higher scanning field repetition frequency may be 150 fields per second and the lower scanning field repetition frequency may be 50 fields per second.

In order that the said invention may be clearly understood and readily carried into effect, the same will now be described by way of example with reference to the accompanying drawings.

Figure 1:
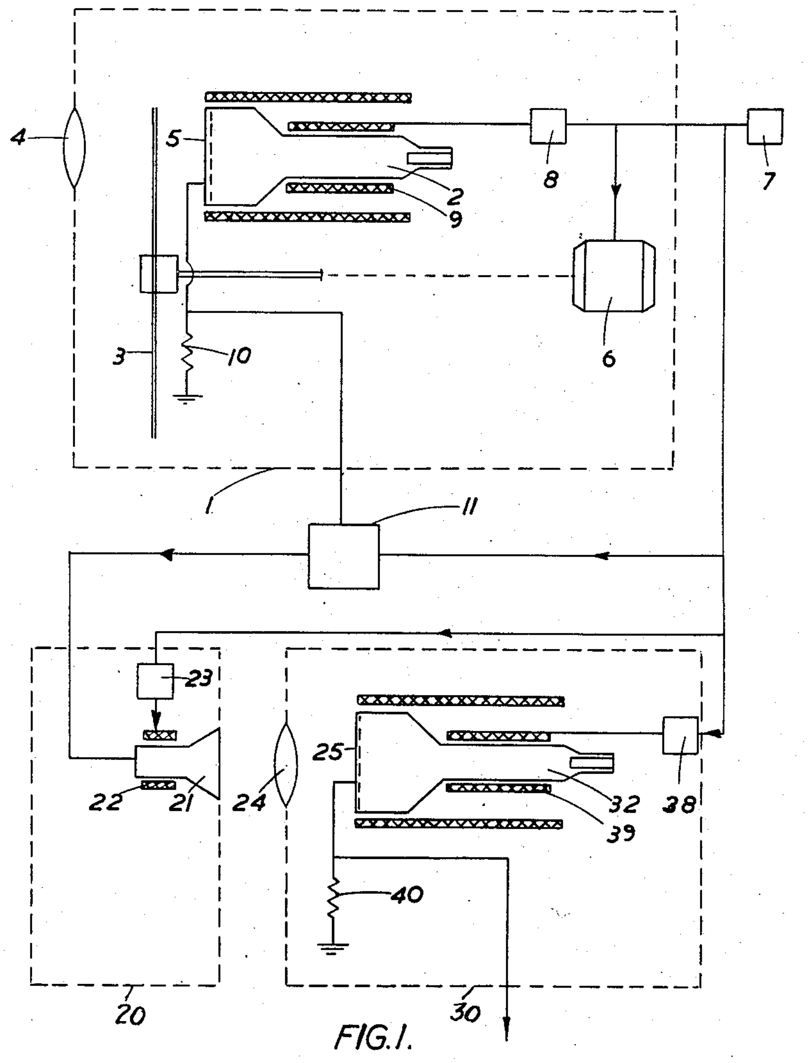
Figure 2:
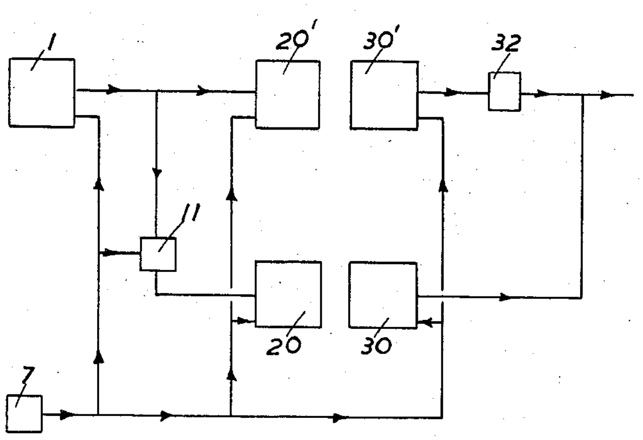
Figure 3:
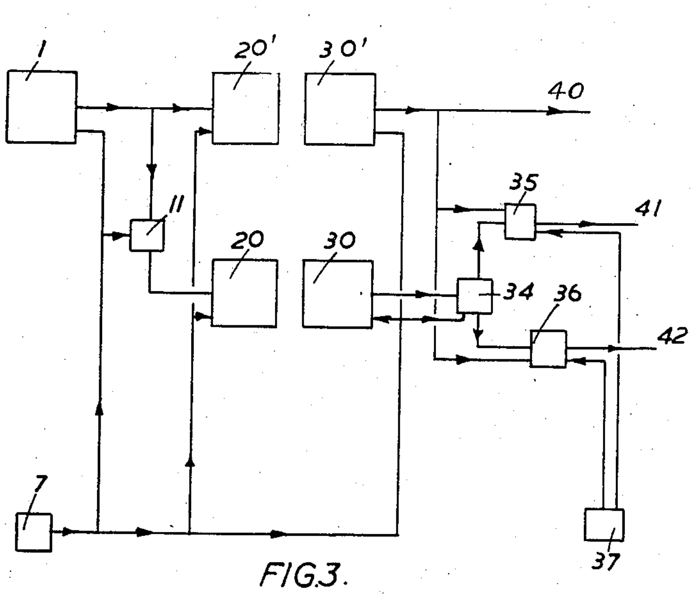
Figure 4:
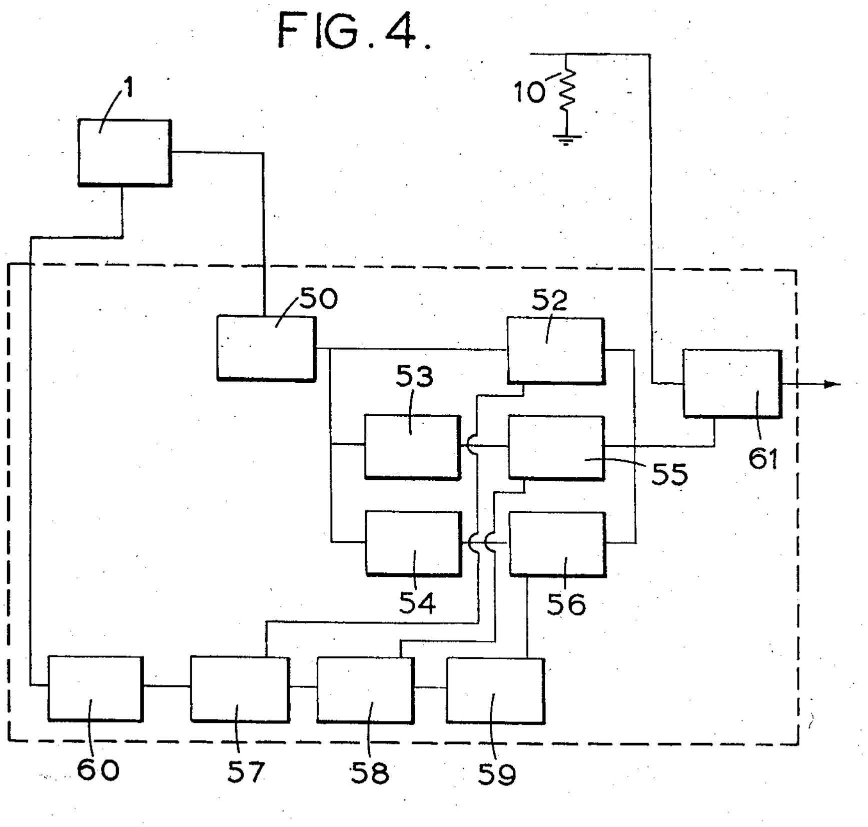

Figure 1 shows an arrangement in accordance with the invention for producing dot sequential signals, Figure 2 shows another arrangement in accordance with the invention for producing signals of a dot sequential type but capable of yielding a picture at the receiver of higher definition than could be obtained by dot sequential signals of the simple type set up by the arrangement of Figure 1, Figure 3 shows a further arrangement according to the invention for producing signals of a so-called compatible type, and Figure 4 which illustrates in block form a suitable construction for a gating circuit used in the arrangements according to Figures 1, 2 and 3.

Referring to Figure 1, the dotted rectangle 1 is representative of a television camera arranged to provide field sequential colour signals in the primary colours, red, blue and green and at a field repetition rate of 150 fields per second. The camera comprises a single pick-up tube 2 of the type which operates with cathode potential stabilisation and the tube may be of the construction described with reference to Figure 6 of the Journal of the Institution of Electrical Engineers, volume 97, part III, No. 50, page 383. The camera is associated with the colour filter disc 3 which is provided in known manner with red, blue and green colour filters angularly or spirally disposed about the axis of the disc. The camera has an objective lens 4 which is arranged to focus an image of an object, signals representative of which are to be transmitted, on to the target of the tube 2. This target is indicated at 5 and light focussed on the target 5 by the lens 4 is projected through whichever colour filter on the disc 3 is at the time disposed before the target. The disc 3 is driven by the electric motor 6 which is synchronised with the field traverse in the pickup tube 2. This synchronisation is indicated in the drawing by showing the motor 6 coupled to a source of synchronising signals 7 which is also coupled to a scanning waveform generator 8 which feeds field and line scanning currents to the appropriate scanning coils of the tube 2. These scanning coils are represented diagrammatically at 9. The signal output of the camera is obtained from an output load resistance 10 in a known manner and this signal output is a colour signal output of field sequential type. The signal output after suitable amplification is fed to a gating circuit 11 which is operated under the control of pulses from the synchronising signal source 7. The gating circuit 11 and the manner in which it functions will be described in more detail subsequently.

Signals that are passed by the gating circuit 11 are applied to reconstituting means represented by the dotted rectangle 20. The reconstituting means 20 comprises an image reconstituting tube 21, the cathode ray beam of which is arranged to be scanned at the repetition rate of 150 fields per second in synchronism with the scanning beam of the pick-up tube 2. For this purpose line and field scanning currents are fed to the scanning coils 22 associated with the reconstituting tube 21, these currents being generated by line and field scanning circuits at 23 controlled by synchronising impulses from the synchronising source 7. The signals from the gating circuit 11 fed to the reconstituting means 20 are applied to a control electrode of the reconstituting tube 21 so as to control the intensity of the beam of the tube 21. The gating circuit 11 functions as follows. The beam of the reconstituting tube 21 is controlled by said signals for periods of a duration of one picture element or dot only at any one time, and during any one field, say a red field, in the scanning of the pick-up tube 2 the beam is controlled in this way during the scanning of every third picture element in each line. For example, in each line of a red field, the beam of tube 21 is controlled during the first, fourth, seventh picture elements and so on. In the intervals between the scanning of these elements the beam is switched off. When the next succeeding field of the pick-up tube 2 is scanned, say a blue field, the beam of the reconstituting tube 21 is controlled by said signals for the periods of picture elements immediately adjacent those for which the beam was controlled in the preceding field, the beam being switched off between said periods. Therefore the beam is controlled during the second, fifth, eighth picture elements and so on of each line. In the next following field, of which the colour is green, the procedure is similar and the beam is controlled for the periods of the third, sixth, ninth picture elements and so on of each line. Therefore in the course of scanning of six consecutive fields (assuming that alternate scanning fields interlace) an overall light pattern is built up on the screen of the tube 21 in the form of a series of dots which represent in cyclic order the intensity of the red, blue and green components of the corresponding picture elements analysed by the pick-up tube 2.

The order of selecting the picture elements may, if desired, vary in cyclic order during groups of scanning fields so that the picture elements representing individual colours do not fall vertically one beneath the other in successive lines. For example, a cycle of variations may occupy six scanning fields, the number required to complete one colour picture, assuming that alternate fields interlace. It is necessary nevertheless that picture elements representing one colour should always occur intermediate picture elements of other colours.

Light from the monochrome picture reconstituted by the reconstituting tube 21 is directed upon a further camera 30. This camera 30 comprises a pick-up tube 32 of the charge storage type similar to the tube 2 in the camera 1 and the light from the reconstituting tube 21 is projected on to the target 25 of the tube 32 through the objective lens 24. The cathode ray beam of the pick-up tube 32 is scanned at a field repetition rate of 50 fields per second by scanning currents generated by the line and field scanning circuits at 38 and fed to the scanning coils 39. The scanning circuits 38 are synchronised by pulses from the synchronising source 7. Output signals from the pick-up tube 32 are developed across the load resistance 40. These signals are colour signals of dot sequential type in the component colours red, blue and green. Signals so generated may be used to modulate a transmitted carrier wave and at a receiver after detection may be separated by a suitable gating circuit so as to provide simultaneous red, blue and green colour signals which may be used to control three separate reconstituting tubes. It will be appreciated that in a studio, for example, a number of cameras such as the camera 1 may be employed controlled by the source 7 and any one of these cameras may be selected to feed signals to the gating circuit 11. For monitoring purposes the signals from each camera may be applied to separate monitoring means operating in field sequential manner at 150 cycles per second.

It will now be appreciated that in the apparatus shown in Figure 1, the camera generates image signals of the field sequential type so that the signals generated during successive fields represent different colour components of the object being televised, the colour fields following one another in a cyclic order predetermined by the disc 3. The signal output from the tube 2 is gated to the reconstituting tube 21 so that a monochromatic light image is produced representing spaced elements of the signals generated respectively during the red, blue and green fields, the corresponding light elements or dots produced on the screen of the tube 21 being arranged in a cyclic order so that the elements representing any one colour occur intermediate the elements of the other colours. When the target 25 of the tube 32 is exposed to the light elements on the screen of the tube 21 a charge image of these light elements is set up since, as aforesaid, the tube 32 is of the charge storage type. The target 25 may thus be said to constitute a storage medium, and the tube 32 stores representations of the signals produced during scanning of spaced elements of the different colour fields in accordance with a "dot sequential" pattern. Moreover, when the target 25 of the tube 32 is scanned by the electron beam of the tube signals representing the dot sequential pattern can be derived from the load resistance 40. In operation the target 25 is of course continuously scanned so that there is no interruption in the dot sequential signals, other than occurs in the normal suppression intervals.

In the construction of the gating circuit 11 which is illustrated in Figure 4, the gating circuit comprises the elements enclosed within the dotted outline of that Figure 1. The gating circuit 11 comprises a square wave oscillator 50 which is required to have a high degree of frequency stability and to generate square wave pulses having a repetition frequency of one third the picture dot frequency. The oscillator is synchronised with the source 7 in any suitable manner. The pulses from the oscillator 50 are fed in parallel to an electronic switch 52 and to two delay networks 53 and 54, the network 53 being arranged to have a delay of one picture dot time and the network 54 having a two picture dot times. The delayed pulses from the networks 53 and 54 are respectively fed to electronic switches 55 and 56 and it will be appreciated that during each sequence of three picture dots the switches 52, 55 and 56 receive pulses in succession. It is arranged that the pulses are of picture dot duration. Switches 52, 55 and 56 are normally open but are controlled by the outputs of three trigger circuits 57, 58 and 59 which are coupled in cascade as indicated. The circuits 57, 58 and 59 are monostable circuits, that is so-called flip-flops, and their time constants are so arranged that when any one of them is triggered to its unstable state, it remains therein for a period of one scanning field and then reverts automatically to its stable state. Moreover the coupling between the circuits 57, 58 and 59 is such that when any one circuit reverts to its stable state it triggers the next circuit to its unstable state. The circuit 57 is coupled to a frequency divider 60 operated by field synchronising signals from the source 7 arranged to trigger the circuit 57 to its unstable state at the beginning of every third scanning field. The divider 60 may consist of a multivibrator, or a step waveform generator type of frequency divider. Consequently, once in every three scanning fields the chain 57, 58 and 59 is stimulated and proceeds to generate three successive pulses each having the duration of one scanning field period. The pulse from the circuit 57 closes the switch 52, the pulse from the circuit 58 closes the switch 55, and the pulse from the circuit 59 closes the switch 56. The arrangement is such that during the first of each group of three successive scanning fields, pulses from the oscillator 50 are passed to a gate 61 and periodically open the gate to admit, say, red picture elements to the reconstituting means 20. During the second field the gate 61 is opened by the pulses from switch 55, and by reason of the delay of the network 53 picture elements (in this case representing blue) are admitted to the means 20 at such times that they produce light elements on the screen of tube 21 intermediate the elements due to the signals admitted during the first colour field. Similarly during the third of the sequence of three fields, the signals elements representing green which are admitted to the means 20 by the gate 61 produce light elements which occur intermediate the red and blue elements by reason of the delay of the network 54. In this way the dot sequential pattern is built up in the screen of the tube 21. Since each of the elements of the circuit 11 may be of a conventional construction, they are merely shown in block form.

The arrangement shown in Figure 2 is similar to that shown in Figure 1 but provision is made to enable a picture of higher definition to be achieved. The rectangle 1 represents a camera of the type described with reference to the same numeral in Figure 1 and the scanning of the camera 1 in Figure 2 is controlled by a source 7 of synchronising impulses as in Figure 1. As in Figure 1 also the output signals from the camera 1 are fed to a gating circuit 11 which is controlled by the pulses from the source 7 and signals gated by the gating circuit 11 are fed to reconstituting means 20, the scanning of which is also controlled by the pulses from the synchronising source 7. Furthermore as in Figure 1 there is included the camera 30 arranged to respond to light from the reconstituting means in the same manner as in Figure 1 and likewise to be synchronised in the same way by the synchronising source 7. The camera 30 provides output signals of the dot sequential type in the manner described with reference to Figure 1.

Besides being fed to the gating circuit 11 so as to be applied to the reconstituting means 20 in gated manner the signals from the camera 1 are fed directly to a second reconstituting means 20'. This latter means is similar to the means 20 and is operated in the same way under the control of the source of synchronising impulses 7. Since it is fed directly with signals from the camera 1, however, each reconstituted field is formed of a complete pattern instead of a partial pattern as in the fields reconstituted by the means 20. Arranged to respond to light from the reconstituting means 20' there is provided a further camera 30' of the same form as the camera 30 and operated in the same manner by controlling impulses from the source 7. By controlling the relative amplitudes of the signals fed to the device 20' during different fields signals are obtained from the camera 30' representing the brightness or luminance of the object and which are capable of a satisfactory rendering in monochrome. These signals which are of high definition compared with the colour signals derived from the camera 30 are fed to filter means represented by 32 which are such as to pass the higher frequency components only of said signals. The signals derived from the filter means 32 and the signals derived from the camera 30 are combined to give signals of the type set up in the mixed-highs, dot sequential system, of which a description is given in "Television Engineering" by D. G. Fink, chapter 9, section 177, with reference to Figures 389 and 390A on pages 520 and 521.

The arrangement of Figure 3 is similar to that of Figure 2 but is modified to enable a signal to be transmitted which can be received satisfactorily in monochrome by existing monochrome receivers while at the same time being capable of reproduction in colour by a suitably designed colour receiver. In Figure 3 references that are the same as in Figure 2 indicate apparatus of similar character and function; thus the camera 1 of Figure 3 is of the same construction and operates in the same way as camera 1 in Figure 2 and feeds field sequential signals with a field repetition frequency of 150 fields per second to the reconstituting device 20', which latter device utilises these signals in identical manner to the device 20' in Figure 2. Likewise the camera 30' which responds to light from the reconstituting device 20' functions in identical manner with the camera 30' in Figure 2, but in Figure 3 the signals that are derived from the camera 30' in monochrome proportions as in Figure 2 are not fed to the high pass filter 32 but are fed directly to a utilisation channel 40. The reconstituting device 20 and camera 30 are of identical construction to the reconstituting device and camera represented by the same reference numerals in Figure 2 and are controlled by the source of synchronising signals 7 in identical manner. As in Figure 2 the reference 11 indicates a gating circuit controlled by the source 7 and having fed to it signals from the camera 1. In Figure 3, however, the gating circuit 11 functions in a modified manner and is arranged to pass signals to the reconstituting device 20 only during the scanning of red and blue fields in the operation of the camera 1. Furthermore, during the scanning of each of the red and blue fields signals are alternately transmitted by the gating circuit and not transmitted by the circuit for periods of the duration of one and a half picture elements and the periods during which red signals are passed by the circuit occupy intervals of the field scanning cycle during which blue signals are not passed by the circuit. In the course of the scanning of three consecutive fields, therefore, an overall light pattern is built up by the reconstituting device 20 in the form of a series of dots representing in dot interlaced manner the intensity of the red and blue components of the corresponding elemental portions of the picture.

This dot pattern is set up with the field repetition rate of 150 fields per second and light from the pattern is directed upon the camera 30 which is arranged to operate with a field repetition rate of 50 fields per second. The output from this camera accordingly is of dot sequential type representative of two colours only, namely, red and blue, the field repetition rate being 50 fields per second. The signals so derived are fed to separating means 34 which functions by the processes of gating to separate the signals into two trains of signals, one representative of the red component and the other representative of the blue component. The separating means 34 may for example comprise valve gates of conventional construction synchronised for example from the source 7. The separated trains of impulses are smoothed by means of suitable low pass filters included in the separating means 34 so as to remove the pulse character of the signals.

Representing the signals derived from the camera 30' and fed to the channel 40 by $E_Y$, the smoothed blue signals derived from the separating means 34 by $E_B$, and the smoothed red signal derived from the separating means 34 by $E_R$ these signals are utilised in a manner to be described to set up a signal the waveform of which may be represented by $$E_M = E_Y + \frac{1}{1.4} \cdot \left( \frac{1}{1.78} E_B - E_Y) \sin wt + (E_R - E_Y) \sin (wt \pm 90°) \right)$$

As explained in an article in "Electronics," January 1952, page 126, entitled "Specifications for Color T. V. Field Tests," a signal of this form is suitable for modulating a transmitted carrier wave so that existing type television receivers can receive a colour signal so transmitted in a satisfactory manner while colour receivers suitably designed can reproduce the signal in colour. In the formula the terms in $w$ represent two oscillations of the same frequency for instance 2.7 mc./s. but having a quadrature relative phase which alternates in sense between successive fields, the transitions of phase occurring in the end of every field. Such transitions serve to reduce inevitable cross talk between the two colour channels, utilising the quadrature phased oscillations. These oscillations have the character of sub-carriers. Preferably the frequency $w$ is chosen so that the two sub-carriers have a frequency which is an odd multiple of half the line repetition rate of scanning of the cameras 30 and 30'. Preferably the frequency $w$ is also selected so that the frequency of the sub-carriers is an odd multiple of half the field repetition frequency of scanning of said cameras. These selections are made so as to reduce to a minimum patterns appearing on the reconstituted picture at the receiver due to the position of the sub-carriers in the band of the monochrome signals represented by $E_Y$.

In the arrangement of Figure 3 difference signals are set up as called for by the above given formula by means of circuits represented at 35 and 36. Thus the smoothed blue signals set up by 34 and fed to 35, and signals from the camera 30' are also fed to 35, so as to set up the difference signal $$E_B - E_Y$$

In similar manner the difference signal $$E_R - E_Y$$

is set up at 36. The circuits 35 and 36 may be of any known construction. At 37 there are generated oscillations of frequency $w$ and of alternating relative quadrature phase as called for by said formula and these oscillations are respectively fed to modulating means at 35 and 36 so that the oscillations become modulated by the respective difference signals generated at 35 and 36. There is thus generated in the channel 41 a sub-carrier signal of frequency $w$ and amplitude representative of the blue component and in the channel 42 a sub-carrier signal of the same frequency but operating in quadrature phase with an amplitude representative of the red component. As already indicated signals $E_Y$ are set up in the channel 40 the three signals of channels 40, 41 and 42 may be combined in accordance with the above given formula to set up a modulating signal $E_M$ which may be used to modulate a transmitted carrier wave. When received by a normal monochrome receiver the detected modulation $E_M$ detected by the detector circuit of this receiver is suitable for setting up a satisfactory monochrome picture on the screen of said receiver. In order to utilise the signal $E_M$ in a colour receiver to provide a picture in colour on the screen of this receiver the signal $E_M$ after being set up in a detector circuit of the receiver in accordance with the normal processes of detection may be applied to a further detector of type which may be such as is described in British patent specification No. 516,630 and which functions to provide detected outputs proportional to $$E_B - E_Y$$
$$E_R - E_Y$$

The signals corresponding to the term $E_Y$ in the formula can be generated by selecting the oscillations of frequency $w$ and subtracting them from the signals $E_M$. The signals $E_Y$ may then be combined respectively with the above-mentioned difference signals to provide the two signals $E_B$ and $E_R$. By combining these latter signals appropriately with the signals $E_Y$, signals $E_G$ representative of the green component may be generated. The three signals $E_G$, $E_B$ and $E_R$ may be applied respectively to the control electrodes of three cathode ray tubes so as to set up three colour images in register on a viewing screen or may be applied to a so-called tri-colour kinescope.

In a modification of the arrangement of Figure 3 the signals that are separated by the means 34 into the respective trains of impulses which after smoothing are fed to the modulating means at 35 and 36 are not separated under the control of impulses from the source 7 but are separated under the control of impulses set up in the signals derived from the camera 30 by suitably arranging the mode of operation of the reconstituting means 20, for example as described in the specification of United States patent application Serial No. 262,361, now Patent No. 2,738,379, issued March 13, 1956. Thus in the modification the signals fed to the reconstituting means 20 are caused to possess a duration not of one and a half elements but of one element only. This is achieved by a suitable construction of the gating circuit 11 and as a result the signals derived from the camera 30 are in the form of a red, blue dot sequence interspersed at every third picture element with signals of constant amplitude. These signals of constant amplitude may take the form of blacker than black impulses and in this instance during the scanning of red and blue fields by the camera 1 a positive D. C. bias is applied to the reconstituting cathode ray tube of the means 20. Alternatively the interspersed signals of constant amplitude may take the form of pulses exceeding the maximum amplitude of the signals representing the red and blue information. Pulses of this form may be generated by applying to the cathode ray tube of the reconstituting means 20 a D. C. bias of suitable amplitude when the camera 1 is exposed to green light. The pulses of constant amplitude set up in either of the above-described ways are employed by the circuit 34 to operate gating means for separating the red and blue signal components fed to 34 from the camera 30 and the gating means is controlled by the interspersed impulses by clipping off said impulses by clipping means and delaying the clipped off impulses by respective durations of one and two picture elements. The delayed impulses and then used to control respective gating circuits. The clipped off impulses may if desired also be utilised for rendering the scanning of the camera 30 more linear by comparing those impulses with pulses generated at a standard rate.

In the above-described arrangements it will be appreciated that if the pick-up tube in the camera 30 is of the kind in which the signal output is derived from a signal plate forming part of the target spurious currents will be set up in the output circuit of such pick-up tubes of the kind known as photo-pulse currents. In the absence of steps to remove such currents undesired patterns become superposed on the final picture to a noticeable degree The intensity of such patterns may be largely reduced by the use of phosphors of long lag for the screen of the associated reconstituting device. It is furthermore possible to expose a photo-cell to light from the reconstituting device and to feed currents derived from the photo-cell to the output circuit of the pick-up tube in opposite sense so as to cause cancellation of the spurious currents. Alternatively the signals that are applied to the reconstituting device may be utilised for the purpose of cancellation after being passed through a circuit for suitably modifying these signals both in amplitude and phase. On the other hand the use of a pick-up tube of signal plate variety may be avoided and a tube of multiplier orthicon type may be employed. Such a tube is free from photo-pulse currents since it utilises the reflected beam for deriving the output signal and does not use a signal plate.

The arrangements described may embody gamma correcting circuits as described in the specification of British application No. 25,274/52. Moreover, negative modulation may be employed in the reconstituting means 20, also as described in the aforesaid patent application.

What I claim is:

1. Apparatus for converting colour television signals of the field sequential type into colour television signals of a different type, comprising a signal storage medium, means for intermittently gating the signals of the field sequential type to said storage medium during fields of one colour to store signal elements of said colour in said storage medium with spaces between stored elements, means for intermittently gating the signals of the field sequential type to said storage medium during fields of a different colour to store signal elements of said different colour in said storage medium with spaces between the stored elements, said gating means being predetermined to position the stored elements of said first colour in said medium between the stored elements of said different colour, and means for reproducing signals from said storage medium, to derive colour television signals of the kind in which each field comprises intercalated signal elements representing different colour components.

2. Apparatus for converting colour television signals of the field sequential type into colour television signals of a different type, comprising a signal storage medium, means for intermittently gating the signals of the field sequential type to said storage medium during fields of one colour to store signal elements of said colour in said storage medium with spaces between stored elements, means for intermittently gating the signals of the field sequential type to said storage medium during fields of a different colour to store signal elements of said different colour in said storage medium with spaces between the stored elements, said gating means being predetermined to position the stored elements of said first colour in said medium between the elements of said different colour, and means for scanning said storage medium at a lower field repetition rate than that of the signals of the field sequential type to reproduce signals from the storage medium, so as to derive colour television signals of the kind in which each field comprises intercalated signal elements representing different colour components.

3. Apparatus according to claim 1, said storage medium comprising display means for producing a light image of applied signals, and a target of an image pick-up tube of the charge storage type disposed for exposure to said light image.

4. Apparatus for generating image signals for colour television comprising a television camera for producing colour television signals of the field sequential type, a signal storage medium, means for intermittently gating the signals produced by said camera to said storage medium during fields of one colour to store signal elements of said colour in said storage medium with spaces between the stored elements, means for intermittently gating the signals produced by said camera to said storage medium during fields of a different colour to store signal elements of said different colour in said storage medium with spaces between the stored elements, said gating means being predetermined to position the stored elements of said first colour in said medium between the stored elements of said different colour, and means for reproducing signals from said storage medium, to derive colour television signals of the kind in which each field comprises intercalated signal elements representing different colour components.

5. Apparatus for converting colour television signals of the field sequential type into colour television signals of a different type, comprising a signal storage medium, means for intermittently gating the signals of the field sequential type to said storage medium during fields of one colour to store signal elements of said colour in said storage medium with spaces between stored elements, means for intermittently gating the signals of the field sequential type to said storage medium during fields of a different colour to store signal elements of said different colour in said storage medium with spaces between the stored elements, said gating means being predetermined to position the stored elements of said first colour in said medium between the stored elements of said different colour, means for applying pulses to said storage medium between some adjacent elements, means for reproducing signals from said storage medium and means for separating said elements in response to said pulses so as to derive colour television signals of the kind in which each field comprises intercalated signal elements representing different colour components.

6. Apparatus for converting colour television signals of the field sequential type into colour television signals of a different type, comprising a signal storage medium, means for intermittently gating the signals of the field sequential type to said storage medium during fields of one colour to store signal elements of said colour in said storage medium with spaces between stored elements, means for intermittently gating the signals of the field sequential type to said storage medium during fields of a different colour to store signal elements of said different colour in said storage medium with spaces between the stored elements, said gating means being predetermined to position the stored elements of said first colour in said medium between the stored elements of said different colour, a further storage medium, means for applying the signals of the field sequential type to said further storage medium to superimpose signals applied during fields of different colours, means for reproducing signals from said further storage medium to derive monochrome signals, and means for combining the signals reproduced from said first storage medium and said further storage medium to derive colour television signals of the kind in which each field comprises intercalated signal elements representing different colour components.

7. Apparatus according to claim 6, further comprising filter means for removing components of low frequency of the signals reproduced from said further storage medium before combining them with the signals derived from said first storage medium.

8. Apparatus according to claim 6, comprising means for separating elements representing different colours from the signals derived from said first storage medium, and means for separately combining elements representing different colours with the signals derived from said further storage medium to produce colour difference signals.

References Cited in the file of this patent

UNITED STATES PATENTS

| | | |
|---|---|---|
| 2,531,031 | France | Nov. 21, 1950 |
| 2,545,957 | Kell | Mar. 20, 1951 |
| 2,587,005 | Smith | Feb. 26, 1952 |
| 2,587,006 | Smith | Feb. 26, 1952 |
| 2,594,715 | Angel | Apr. 29, 1952 |
| 2,607,845 | Clark | Aug. 19, 1952 |